US011214215B2

(12) United States Patent
Kobayashi et al.

(10) Patent No.: US 11,214,215 B2
(45) Date of Patent: Jan. 4, 2022

(54) SIDE AIRBAG APPARATUS

(71) Applicant: Autoliv Development AB, Vargarda (SE)

(72) Inventors: Yuto Kobayashi, Kanagawa (JP); Hideho Fukuda, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 17 days.

(21) Appl. No.: 16/884,378

(22) Filed: May 27, 2020

(65) Prior Publication Data

US 2020/0377051 A1 Dec. 3, 2020

(30) Foreign Application Priority Data

May 30, 2019 (JP) .............................. JP2019-101304
Mar. 9, 2020 (JP) .............................. JP2020-040148

(51) Int. Cl.
*B60R 21/207* (2006.01)
*B60R 21/2165* (2011.01)
(Continued)

(52) U.S. Cl.
CPC ........ *B60R 21/207* (2013.01); *B60R 21/2165* (2013.01); *B60R 21/237* (2013.01);
(Continued)

(58) Field of Classification Search
CPC .............. B60R 21/207; B60R 21/2165; B60R 21/23138; B60R 2021/23146
See application file for complete search history.

(56) References Cited

U.S. PATENT DOCUMENTS

2006/0061073 A1*  3/2006  Naruse ................ B60R 21/21
                                              280/730.2
2011/0049849 A1*  3/2011  Choi .................. B60R 21/2176
                                              280/730.2
(Continued)

FOREIGN PATENT DOCUMENTS

CN         108501856 A  *  9/2018  .......... B60R 21/231
DE   202006008373 U1  *  9/2006  .......... B60R 21/201
(Continued)

OTHER PUBLICATIONS

Fuma et al. JP 2014-172550A Machine English Translation, ip.com (Year: 2014).*

*Primary Examiner* — Karen Beck
(74) *Attorney, Agent, or Firm* — Harness, Dickey & Pierce, P.L.C.; Stephen T. Olson (57) ABSTRACT

[Problem] To provide a side airbag apparatus that improves passenger restraining performance and maintains a form at the time of housing.
[Solution] A side airbag apparatus 100 includes a frame-side plate portion 114 of a seat 102, and an airbag module 106 attached to the frame-side plate portion 114. The airbag module 106 includes a bracket 112, an inflator 110, an airbag cushion 108, and a soft cover 116 that is wrapped around the bracket 112 and the airbag cushion 108 in a housing form. The bracket 112 includes a through-hole 128 through which a stud bolt 118 extending from the inflator 110 passes, and a hook 130 provided at predetermined location on the front side of the frame-side plate portion 114. The soft cover 116 includes a bolt anchoring hole 120 to which the stud bolt 118 is hooked, and a hook anchoring hole 122 to which the hook 130 of the bracket 112 is hooked.

14 Claims, 7 Drawing Sheets

(51) Int. Cl.
  *B60R 21/231*     (2011.01)
  *B60R 21/237*     (2006.01)
  *B60R 21/26*      (2011.01)

(52) U.S. Cl.
  CPC ........ *B60R 21/23138* (2013.01); *B60R 21/26* (2013.01); *B60R 2021/23146* (2013.01)

(56) References Cited

U.S. PATENT DOCUMENTS

| | | | | |
|---|---|---|---|---|
| 2012/0038131 | A1* | 2/2012 | Muller | B60R 21/207 280/728.2 |
| 2015/0367803 | A1* | 12/2015 | Fujiwara | B60R 21/207 280/728.2 |
| 2017/0291565 | A1* | 10/2017 | Yamamoto | B60R 21/235 |
| 2021/0107428 | A1* | 4/2021 | Toba | B60R 21/23138 |

FOREIGN PATENT DOCUMENTS

| | | | | |
|---|---|---|---|---|
| JP | H09295547 A | * | 11/1997 | |
| JP | 2002225668 A | * | 8/2002 | ........... B60R 21/207 |
| JP | 2011121511 A | * | 6/2011 | ........... B60R 21/207 |
| JP | 2014172550 A | * | 9/2014 | ........... B60R 21/207 |
| JP | 2015074295 A | | 4/2015 | |
| KR | 20110021075 A | * | 3/2011 | ......... B60R 21/2176 |
| WO | WO-2013081020 A1 | * | 6/2013 | ........... B60N 2/5841 |
| WO | WO-2013137355 A1 | * | 9/2013 | ........... B60R 21/207 |

* cited by examiner

SIDE AIRBAG APPARATUS

CROSS-REFERENCE TO RELATED APPLICATIONS

This application claims the benefit of Japan Patent Application No. 2019-101304 filed on May 30, 2019 and Japan Application No. 2020-040148 filed on Mar. 9, 2020, the disclosures of which are herein incorporated by reference in their entirety.

TECHNICAL FIELD

The present invention relates to a side airbag apparatus mounted on a vehicle.

BACKGROUND

Airbag devices have generally become standard equipment in vehicles in recent years. An airbag device is a safety device that is actuated in the event of an emergency such as a vehicle collision to receive and protect a passenger by inflating and deploying a bag-shaped airbag cushion with gas pressure.

There are various types of airbag devices depending on the installation site and application. For example, a front airbag device is provided at the center of a steering wheel to protect the driver from a collision in the front-back direction. In addition, to protect the passenger from an impact from a vehicle width direction due to a side surface collision or the like, a curtain airbag device is provided near a ceiling above a side window, and a side airbag apparatus is provided at a side portion of the seat.

The airbag cushion of a typical airbag device is in a wound or folded housing form and is housed in each portion of a vehicle. For example, Patent Document 1 discloses a technology related to a cover member 106 that encloses an airbag cushion by the applicant of the present application. Patent Document 1 describes a side airbag apparatus in which a cushion member 106 is wrapped by a cover member 114 and placed at a side portion of a backrest of a vehicle seat. The cover member 114 is formed from a nonwoven fabric or the like, and is configured so that one part thereof breaks due to inflation and deployment of the cushion member 106.

RELATED ART DOCUMENTS

Patent Documents

[Patent Document 1] Japanese Unexamined Patent Publication No. 2015-74295

SUMMARY OF THE INVENTION

Problem to be Solved by the Invention

Currently, further improvement in the passenger restraining performance of the airbag cushion is demanded on a side airbag apparatus. Improving the passenger restraining performance includes, for example, measures such as ensuring a portion that becomes some kind of support for the airbag cushion. However, the airbag cushion of the side airbag apparatus is often provided at the end of the backrest of the vehicle seat, and in many cases, only a soft member made from a urethane material, or the like exists on the side opposite to the passenger. In addition, as in the cover member 114 of Patent Document 1 described above, there is also a need for a device for maintaining the housing form of the airbag cushion.

In light of the problems described above, an object of the present invention is to provide a side airbag apparatus that improves the passenger restraining performance and maintains a form at the time of housing.

Means for Solving the Problem

In order to solve the problem described above, a representative configuration of a side airbag apparatus according to the present invention is a side airbag apparatus including a frame-side plate portion along a side surface of a backrest of an internal frame of a vehicle seat, and an airbag module attached to the frame-side plate portion, where the airbag module includes a bracket attached to a center side in a width direction of the backrest of the frame-side plate portion and extended to a front side of the frame-side plate portion, an inflator fixed to the center side of the bracket, an airbag cushion wound or folded to a predetermined housing form, and fixed to a center side of the bracket along with the inflator, and a soft cover that is wrapped around the bracket and the airbag cushion in the housing form and is breakable at an inflation pressure of the airbag cushion, the bracket includes a through-hole through which a stud bolt extending from the inflator passes, and a hook provided at predetermined location on a front side of the frame-side plate portion, and the soft cover includes a bolt anchoring hole to which the stud bolt passed through the bracket is hooked, and a hook anchoring hole to which the hook of the bracket is hooked.

The airbag cushion described above is arranged on the center side with respect to the frame-side plate portion and the bracket of the vehicle seat. Thus, with the configuration described above, the airbag cushion can easily obtain a reaction force from the bracket when restraining the passenger, and the passenger restraining performance of the airbag cushion can be improved. In addition, in the configuration described above, the soft cover can be easily wrapped around the bracket and the airbag cushion using the stud bolt of the inflator and the hook of the bracket. Thus, the housing form of the airbag cushion can be suitably held not only during the traveling of the vehicle but also before the assembly of the airbag module to the vehicle.

The soft cover described above may have a frangible portion that is breakable at the inflation pressure of the airbag cushion. The soft cover can suitably open the airbag cushion when the frangible portion is broken.

The plurality of hook anchoring holes may be formed side by side in a row, and the frangible portion of the soft cover may be provided in a region between two adjacently formed hook anchoring holes. With this configuration, the soft cover can suitably open the airbag cushion.

The bracket may include a base that lies along the frame-side plate portion and to which the inflator and the airbag cushion are fixed, and a reaction force plate that is extended from the base toward an outer side in a width direction of the backrest across the front edge of the frame-side plate portion, and further bent and extended toward the front side, the through-hole may be provided in the base, and the hook may be provided on the reaction force plate.

According to the configuration described above, with the arrangement of the reaction force plate on the bracket, the airbag cushion can efficiently obtain a reaction force from the bracket.

The bracket described above may have a predetermined rigidity that is harder than the airbag cushion and the soft cover. The bracket thus can suitably support the airbag cushion at the time of inflation and deployment.

In order to solve the problem described above, another representative configuration of a side airbag apparatus according to the present invention is a side airbag apparatus including a frame-side plate portion along a side surface of a backrest of an internal frame of a vehicle seat, and an airbag module attached to the frame-side plate portion, where the airbag module includes a bracket attached to a center side in a width direction of the backrest of the frame-side plate portion and extended to a front side of the frame-side plate portion, an inflator fixed to the center side of the bracket, an airbag cushion wound or folded to a predetermined housing form, and fixed to a center side of the bracket along with the inflator, and a soft cover that is wrapped around the bracket and the airbag cushion in the housing form, the bracket includes a through-hole through which a stud bolt extending from the inflator passes, and a predetermined insertion hole provided at a location on a front side of the frame-side plate portion, and the soft cover includes a bolt anchoring hole to which the stud bolt passed through the bracket is hooked, and a hook that is hooked on the insertion hole of the bracket.

The airbag cushion described above is arranged on the center side with respect to the frame-side plate portion and the bracket of the vehicle seat. Thus, in the configuration described above as well, the airbag cushion can easily obtain a reaction force from the bracket when restraining the passenger, and the passenger restraining performance of the airbag cushion can be improved. In addition, in the configuration described above, the soft cover includes a bolt anchoring hole and a hook, and can be easily wrapped around the bracket and the airbag cushion. Thus, the housing form of the airbag cushion can be suitably held not only during the traveling of the vehicle but also before the assembly of the airbag module to the vehicle.

In the soft cover, the hook may deform upon receiving an inflation pressure of the airbag cushion, and fall out from the insertion hole of the bracket. With this configuration, the soft cover can suitably open the airbag cushion at the time of inflation and deployment of the airbag cushion.

The soft cover described above may have a frangible portion that is breakable at the inflation pressure of the airbag cushion. The soft cover can suitably open the airbag cushion when the frangible portion is broken.

The bracket may include a base that lies along the frame-side plate portion and to which the inflator and the airbag cushion are fixed, and a reaction force plate that is extended from the base toward an outer side in a width direction of the backrest across the front edge of the frame-side plate portion, and further bent and extended toward the front side, the through-hole may be provided in the base, and the insertion hole may be provided in the reaction force plate.

In the configuration described above as well, with the arrangement of the reaction force plate on the bracket, the airbag cushion can efficiently obtain a reaction force from the bracket.

The hook preferably has a predetermined rigidity that is harder than main body of the soft cover and softer than the bracket. The hook thereby deforms upon receiving a force of a certain extent by the inflation pressure of the airbag cushion, and suitably falls off from the insertion hole.

Effects of the Invention

According to the present invention, a side airbag apparatus that improves passenger restraining performance and maintains a form at the time of housing can be provided.

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention.

Figure 1A:
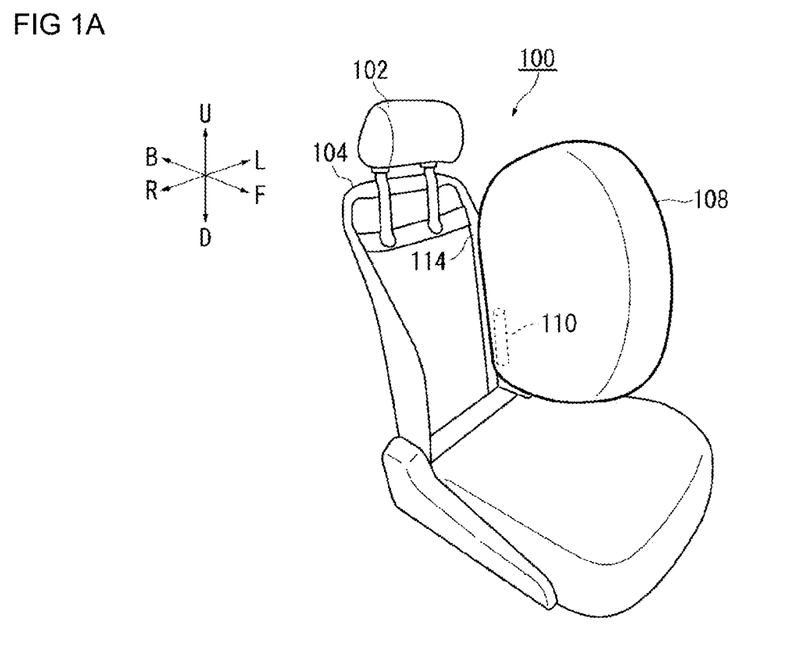
FIGS. 1A and 1B are views illustrating a side airbag apparatus according to an embodiment of the present invention.
Figure 1B:
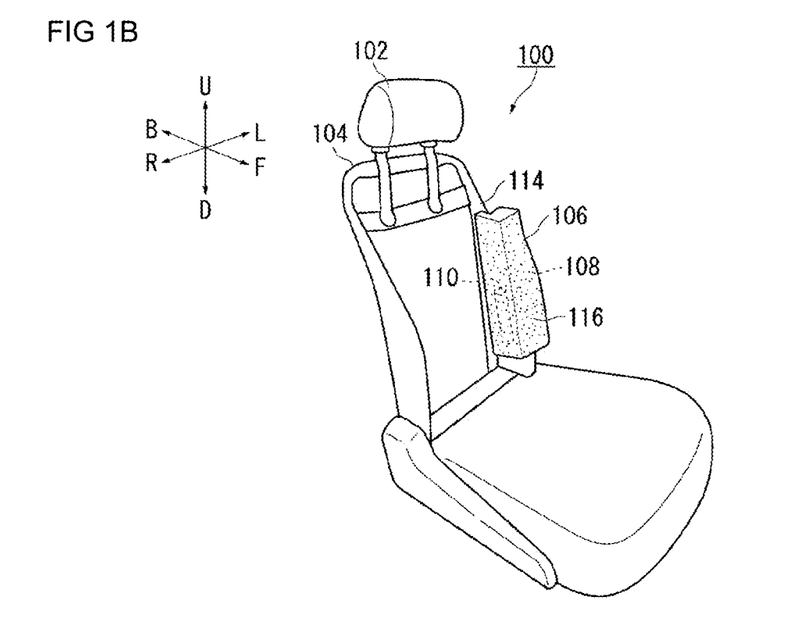

FIGS. 1A and 1B are views illustrating an example of a side airbag apparatus according to an embodiment of the present invention. FIG. 1A illustrates the condition at the time of actuation of the airbag cushion. FIG. 1A illustrates, from a right side in the vehicle width direction on the front side of the vehicle, a side airbag apparatus 100 and a seat 102 of the vehicle in which the side airbag apparatus 100 is applied. Furthermore, the front-back direction with respect to the seat 102 is appropriately indicated by arrows F (Forward) and B (Back), respectively, the left-right is indicated by arrows L (Left) and R (Right), respectively, and the up-down direction is indicated by arrows U (up) and D (down), respectively.

In FIG. 1A, the epidermis or sheet pad (e.g., urethane material) of the backrest of the seat 102 is omitted, and only the internal frame 104 is illustrated. The internal frame 104 is a member that becomes a skeleton incorporated in the backrest. Note that the seat 102 is assumed to be disposed on the left side of the front row. However, the side airbag apparatus 100 can be installed on any seat of the front column, the back row, and on either left or right sides of the vehicle. Furthermore, the seat 102 is normally directed toward the front side of the vehicle, but it is also assumed that the seat 102 may be rotated to be directed toward the back side. Thus, the directions illustrated by the arrows in the drawings are not intended to be limited to the front, back, left, and right directions relative to the vehicle, and the direction of the front surface may be the "front" and the direction of the back side may be the "back" when viewed from the passenger regularly seated on the seat 102. Similarly, the direction of the right hand of the passenger at this time is "right" and the left hand direction is "left". Furthermore, the direction toward the head is "up", and the direction toward the leg is "down" with respect to the center of the body of the passenger at this time.

The side airbag apparatus 100 restrains the passenger seated on the seat 102 from the side using the airbag cushion 108 at the time of an emergency, such as in the event of an impact on a vehicle. The airbag cushion 108 is a bag-shaped member that receives the passenger, and is formed by overlapping a plurality of base cloths configuring the surface and sewing or adhering the same, by spinning and weaving using an OPW (One-Piece Woven), and the like.

An inflator 110 is a gas generating device, and is operated upon receiving an operation signal transmitted from a vehicle side at the time of occurrence of an impact to supply gas to the interior of the airbag cushion 108. In the present embodiment, a cylinder type (cylindrical) is adopted for the inflator 110. The inflator 110 is incorporated on the back side of the interior of the airbag cushion 108 with the longitudinal direction facing the up-down direction.

Exemplary currently prevailing inflators include: a type which is filled with a gas generating agent and burns the agent to generate gas; a type which is filled with compressed gas and supply gas without generating heat; or a hybrid type which utilizes both combustion gas and compressed gas; etc. Any type can be used for the inflator 110.

FIG. 1B is a view illustrating the condition before the actuation of the airbag cushion 108 of FIG. 1A. The airbag cushion 108 before actuation is wound or folded to a housing form, and is incorporated in the backrest of the seat. Here, the airbag cushion 108 is unitized with the inflator 110 and the bracket 112 described below, and forms an airbag module 106.

The airbag module 106 is assembled to a frame-side plate portion 114 of the internal frame 104. The frame-side plate portion 114 is a portion of the internal frame 104 along the left and right side surfaces of the backrest. A pair of frame-side plate portions 114 are provided on the left and right sides in the vehicle width direction. In the present embodiment, the airbag module 106 is assembled to the frame-side plate portion 114 on the left side in the vehicle width direction. Note that the airbag module 106 can be assembled to the frame-side plate portion on the right side in the vehicle width direction. In other words, the airbag module 106 can be installed on a side portion (near side) on the door side close to the collision place of the seat 102 and a side portion (far side) on the vehicle interior side distant from the collision place.

The airbag module 106 also includes a soft cover 116 that covers the airbag cushion 108 in a housing form. The soft cover 116 is configured from a nonwoven fabric or the like, wrapped around the bracket 112 and the airbag cushion 108 in a housing form, and broken at the inflation pressure of the airbag cushion 108 to release the airbag cushion 108.

Figure 2A:
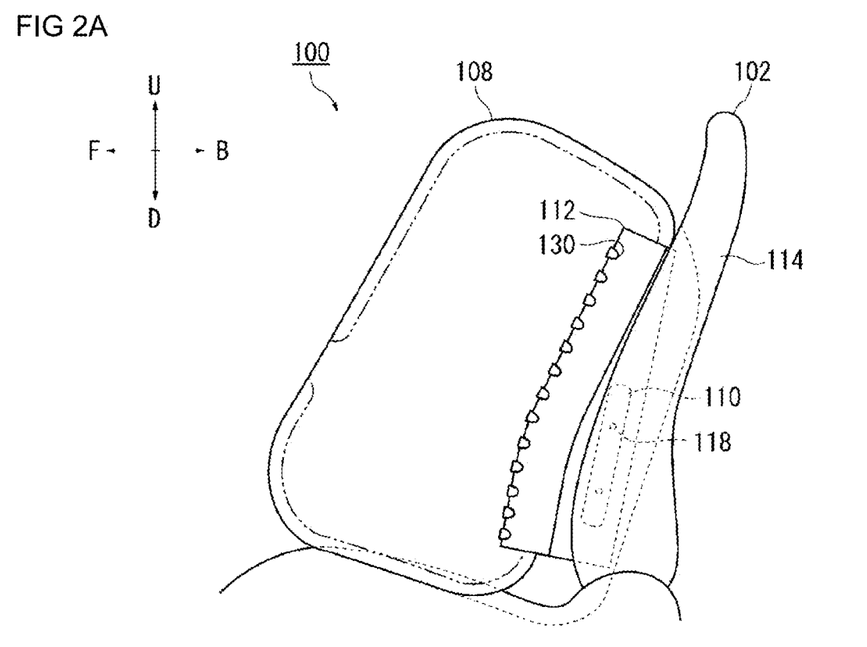
FIGS. 2A and 2B are views illustrating an airbag cushion of each state of FIGS. 1A and 1B from the side of a seat.
Figure 2B:
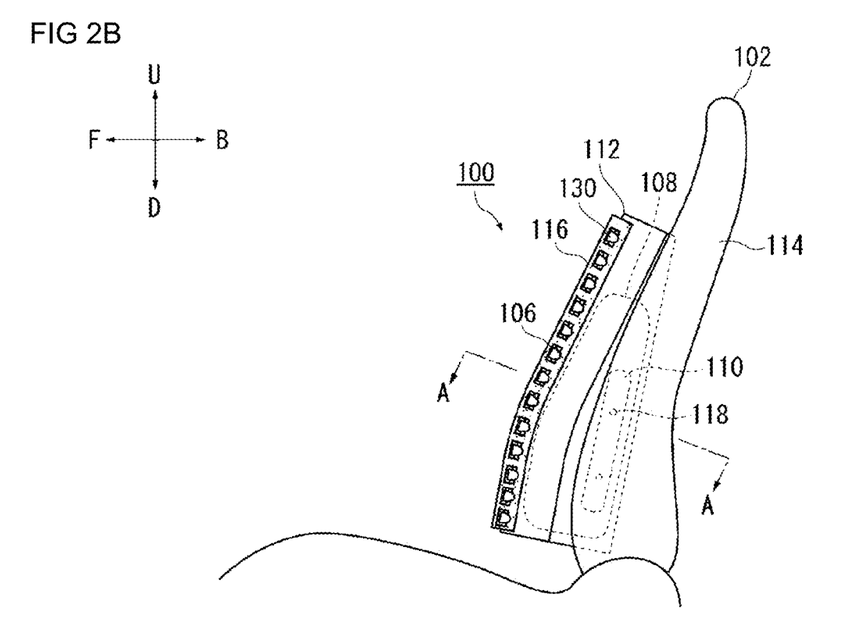

FIGS. 2A and 2B are views showing the airbag cushion 108 of each state of FIGS. 1A and 1B from the side of the seat 102. FIG. 2A illustrates the airbag cushion 108 at the time of actuation of FIG. 1A. As illustrated in FIG. 2A, the airbag cushion 108 of the present embodiment is inflated and deployed from the frame-side plate portion 114 toward the front side thereof.

In the present embodiment, the bracket 112 is attached to the frame-side plate portion 114 along with the airbag cushion 108 and the inflator 110. The bracket 112 is a member made of resin having a rigidity of a certain extent that is harder than the airbag cushion 108 and the soft cover 116, and supports the airbag cushion 108 at the time of inflation and deployment. The bracket 112 has a longitudinal shape along the up-down direction of the frame-side plate portion 114, and supports the airbag cushion 108 from outer side in the width direction of the seat 102. The bracket 112 is extended further toward the front side than the frame-side plate portion 114 to broadly support the airbag cushion 108.

FIG. 2B illustrates the airbag cushion 108 in a housing form of FIG. 1B. The airbag cushion 108 in the housing form has a vertically long shape along the bracket 112 and has the soft cover 116 wrapped on the outer side.

Figure 3A:
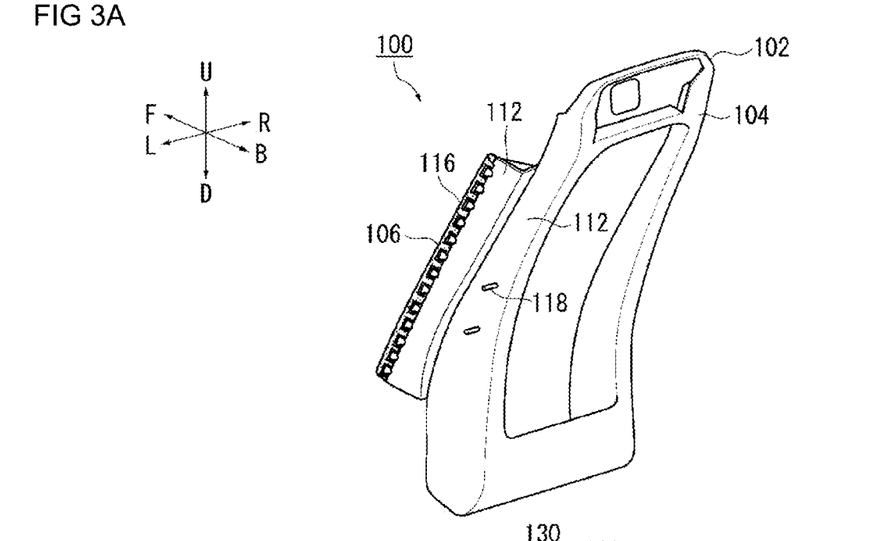
FIGS. 3A and 3B are perspective views of the side airbag apparatus of FIG. 2B.
Figure 3B:
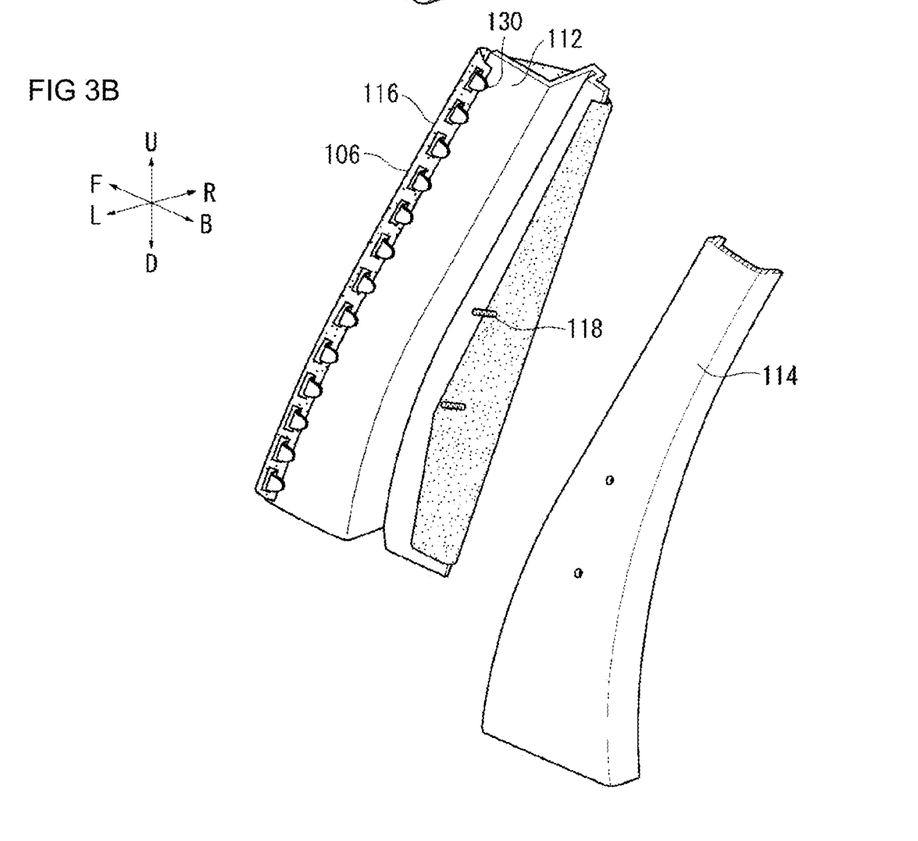

FIGS. 3A and 3B are perspective views of the side airbag apparatus 100 of FIG. 2B. FIG. 3A shows the side airbag apparatus 100 of FIG. 2B from the upper side of the left back side of the seat. In the present embodiment, the airbag module 106 including the bracket 112 is attached to the center side in the width direction of the backrest of the frame-side plate portion 114.

FIG. 3B is a view in which the airbag module 106 is separated from the frame-side plate portion 114 of FIG. 3A. Two stud bolts 118 included in the inflator 110 are protruded out from the airbag module 106. The stud bolt 118 is provided at two locations separated in the longitudinal direction of the main body of the inflator 110. The inflator 110 is extended to pass through the airbag cushion 108 (see FIG. 2A) and the bracket 112 and is fastened to the frame-side plate portion 114.

Figure 4:
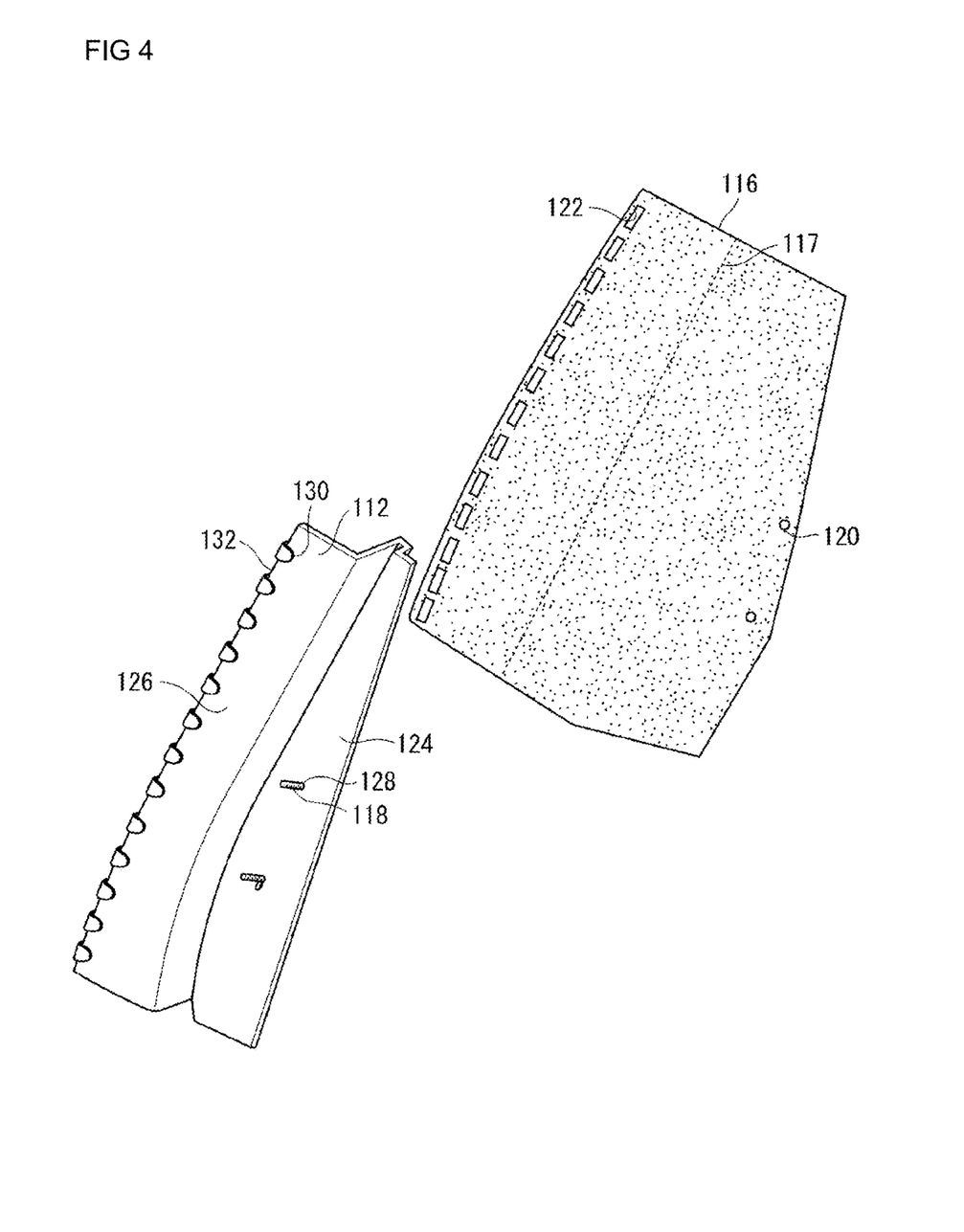
FIG. 4 is a view in which a soft cover is separated from a bracket of FIG. 3B.

FIG. 4 is a view in which the soft cover 116 is separated from the bracket 112 of FIG. 3B. The soft cover 116 is a member for holding the airbag cushion 108 (see FIG. 2B) in a housing form on the bracket 112. The soft cover 116 is configured from a nonwoven fabric or the like and is used by being hooked to the stud bolt 118 and the hook 130 of the bracket 112. The soft cover 116 has a flexibility of a certain extent that is softer than the bracket 112, and can deform following the shape of the airbag cushion 108 and the shape of the interior of the seat 102 (see FIG. 1A). The soft cover 116 is wrapped to cover the entire airbag cushion 108, but may also be configured to cover only a portion of the airbag cushion 108.

The soft cover 116 includes a bolt anchoring hole 120 to which the stud bolt 118 passed through the bracket 112 is hooked, and a plurality of hook anchoring holes 122 to which a plurality of hooks 130 provided on the bracket 112 are hooked. The plurality of hook anchoring holes 122 are formed side by side in a row.

The soft cover 116 has a frangible portion 117 that is breakable at the inflation pressure of the airbag cushion 108. The frangible portion 117 is a discontinued line lined to a broken line form, and is provided to bisect the soft cover 116 along the longitudinal direction of the bracket 112 (see FIG. 3B). The soft cover 116 can suitably open the airbag cushion 108 when the frangible portion 117 is broken. Note that the frangible portion 117 can be realized as a configuration in which the discontinued lines are lined to a nick form or a configuration in which small slits (through-holes) are lined.

As described above, the bracket 112 is a part that supports the airbag cushion 108 at the time of inflation and deployment having a rigidity of a certain extent that is harder than the airbag cushion 108 and the soft cover 116. For example, the bracket 112 may be formed using a resin for the material. Note that the bracket 112 can be formed containing not only a resin but also a metal, and a configuration having an appropriate rigidity can be suitably embodied with any material.

The bracket 112 includes a base 124 to which the inflator 110 (see FIG. 2B) and the airbag cushion 108 are fixed, and a reaction force plate 126 that applies a reaction force at the time of inflation of the airbag cushion 108. The base 124 is formed to a planar shape along the frame-side plate portion 114, and is formed with a through-hole 128 through which the stud bolt 118 passes. The reaction force plate 126 is bent from the front side of the base 124 to extend in the vehicle width direction toward the outer side of the vehicle, and is further bent to extend toward the front side. The presence of the reaction force plate 126 allows the airbag cushion 108 to push the reaction force plate 126 and inflate and deploy efficiently toward the front side of the vehicle.

The plurality of hooks 130 that hook the soft cover 116 are provided along the front edge 132 at a location on the outer side in the vehicle width direction of the reaction force plate 126, which is a location on the front side of the frame-side plate portion 114, of the bracket 112.

The soft cover 116 can be easily wrapped around the bracket 112 and the airbag cushion 108 (see FIG. 2B) using two stud bolts 118 passed through the base 124 and a plurality of hooks 130 on the front edge 132 of the reaction force plate 126. Wrapping the soft cover 116 allows the housing form of the airbag cushion 108 to be suitably held not only during the traveling of the vehicle but also before the assembly of the airbag module 106 to the vehicle.

Figure 5:
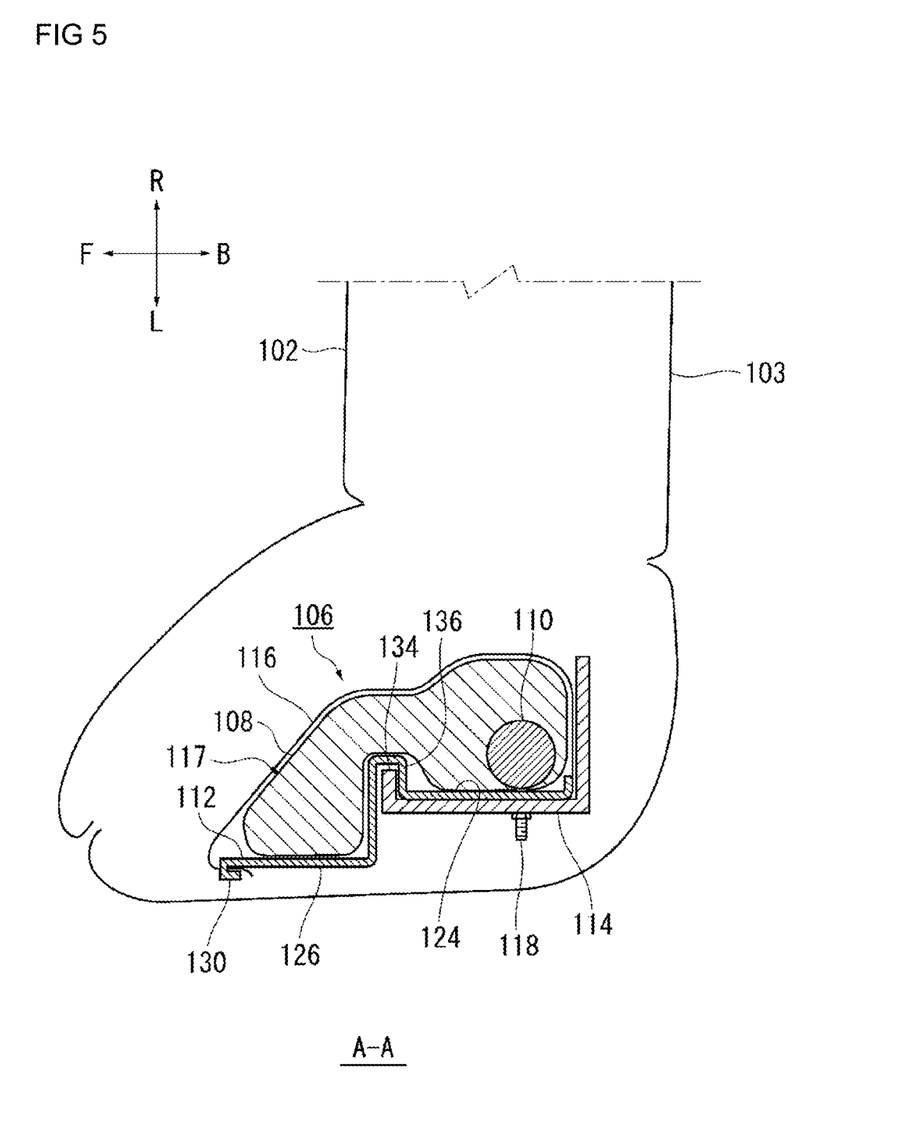
FIG. 5 is a cross-sectional view taken along A-A of the airbag module A before actuation of FIG. 2B.

FIG. 5 is a cross-sectional view taken along A-A of the airbag module 106 before the actuation of FIG. 2B. As illustrated in FIG. 5, the bracket 112 is attached to the center side in the width direction of the backrest 103 with respect to the frame-side plate portion 114. The main body of the inflator 110 and the airbag cushion 108 are provided on the center side with respect to the bracket 112. The stud bolt 118 is passed through the airbag cushion 108, the bracket 112, and the frame-side plate portion 114 from the main body of the inflator 110.

The frangible portion 117 of the soft cover 116 is provided to be located in front of the airbag cushion 108 in a state in which the airbag module 106 is attached to the frame-side plate portion 114. When the airbag cushion 108 is inflated and deployed toward the front side from the frame-side plate portion 114, the frangible portion 117 can be efficiently broken as the frangible portion 117 is located in front of the airbag cushion 108.

The reaction force plate 126 of the bracket 112 is extended from the base 124 toward the outer side in the width direction of the backrest 103 across the front edge 134 of the frame-side plate portion 114 and further bent and extended toward the front side. Thus, when the passenger comes into contact, the airbag cushion 108 efficiently obtains a reaction force from the reaction force plate 126 on the opposite side, thus suitably absorbing the passenger's load and more fully restraining the passenger.

The reaction force plate 126 is formed to engage with the frame-side plate portion 114. For example, the front edge 134 of the frame-side plate portion 114 is bent toward the center side in the width direction of the backrest 103. In the reaction force plate 126 of the bracket 112, a recess 136 is formed along the front edge 134 of the frame-side plate portion 114. The recess 136 has a shape of once being bent from the front side of the base 124 toward the center side in the width direction of the backrest 103, crossing the front edge 134 of the frame-side plate portion 114, and then being bent toward the outer side in the width direction. Furthermore, the reaction force plate 126 is extended toward the outer side in the width direction across the front edge 134 of the frame-side plate portion 114, and further bent and extended toward the front side of the vehicle therefrom.

The bracket 112 is engaged with the front edge of the frame-side plate portion 114 by the recess 136. According to such a configuration, the bracket 112 prevents positional shift with respect to the frame-side plate portion 114 and is able to support the airbag cushion 108 without losing the posture at the time of inflation and deployment of the airbag cushion 108. Furthermore, the reaction force plate 126 can efficiently apply a reaction force from the back side and the side to the inflating and deploying airbag cushion 108 by a portion extending in the vehicle width direction and a portion extending toward the front side of the vehicle.

As described above, according to the present embodiment, in addition to the housing form of the airbag cushion 108 being suitably held by the soft cover 116, the passenger restraining performance of the airbag cushion 108 can be improved as the airbag cushion 108 can easily obtain a reaction force from the bracket 112 when restraining the passenger.

Note that while the soft cover 116 has been described as using a nonwoven fabric for the material, the soft cover 116 can be realized by other materials. For example, the soft cover 116 can be realized by a heal welding fabric or a material same as the base fabric of the airbag cushion 108. Furthermore, when heat welding fabric is used as a material, it is possible to form a single soft cover 116 by heat welding the edges of the plurality of end materials. In this case, since the edges of the airbag cushion 108 peel off by the inflation pressure of the airbag cushion 108, the edges can be used as a frangible portion.

MODIFIED EXAMPLES

Figure 6:
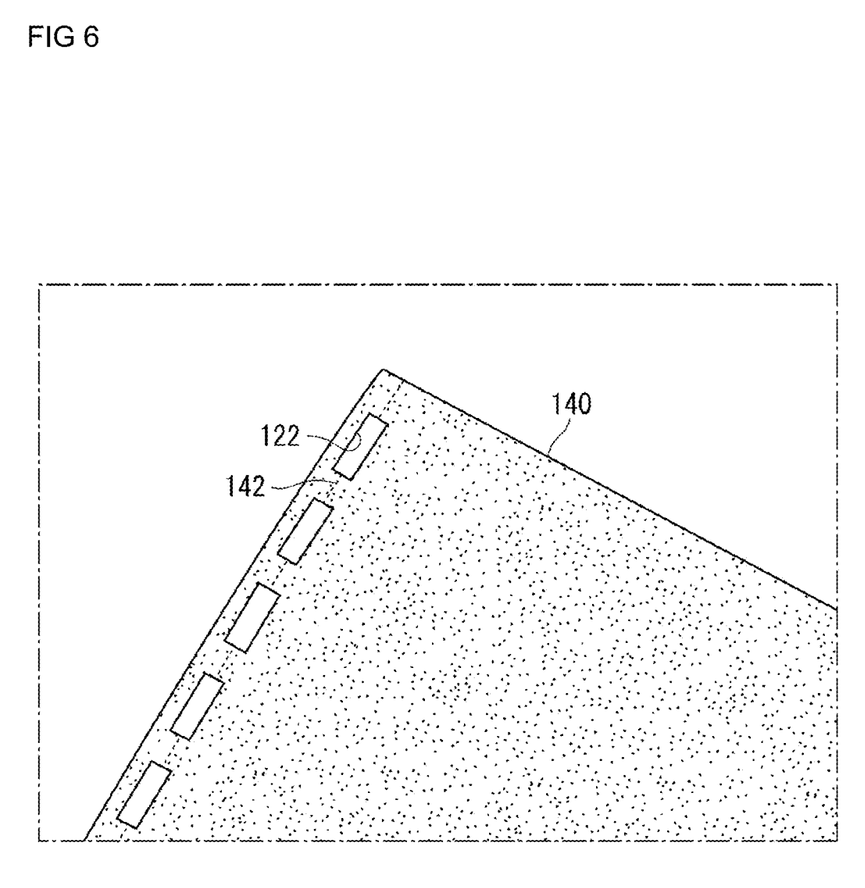
FIG. 6 is a view illustrating a first modified example of the soft cover of FIG. 4.

FIG. 6 is a view illustrating a first modified example (soft cover 140) of the soft cover 116 of FIG. 4. In the following description, the same components as described above are denoted with the same reference symbols, and the descriptions thereof will be omitted. Moreover, the components having the same names as the components described above shall have the same configurations and functions unless even when denoted with different reference symbols.

In the soft cover 140 shown in FIG. 6, a frangible portion 142 is formed in each of the narrow regions between two adjacently formed hook anchoring holes 122. The frangible portion 142 may also be broken by the inflation pressure of the airbag cushion 108 (see FIG. 5, etc.). The soft cover 160 may also suitably open the airbag cushion 108 when the frangible portion 142 is broken at the time of inflation of the airbag cushion 108.

Figure 7:
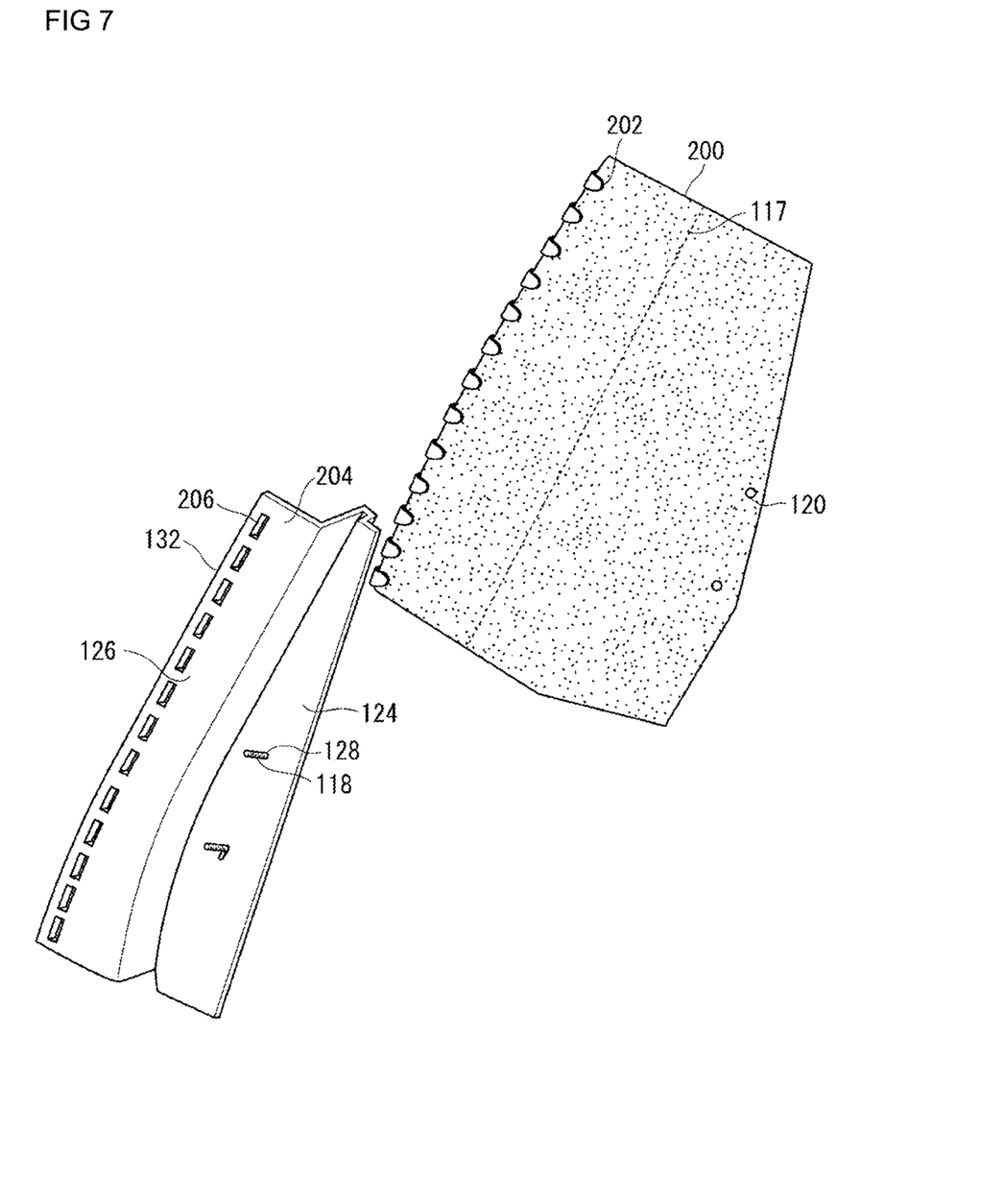
FIG. 7 is a view illustrating a modified example of each of the bracket and the soft cover of FIG. 4.

FIG. 7 is a view illustrating a modified example of each of the bracket 112 and the soft cover 116 in FIG. 4. The soft cover 200 of the second modified example illustrated in FIG. 7 includes a plurality of hooks 202 on the front edge side. The bracket 204 includes a plurality of insertion holes 206 along the front edge 132 of the reaction force plate 126. In addition to the stud bolts 118, the soft cover 200 can be easily wrapped around the bracket 204 and the airbag cushion 108 by hooking the plurality of hooks 202 to the insertion holes 206 of the bracket 204.

The hook 202 of the soft cover 200 may be set to have a rigidity deformable with a force of a certain extent that is harder than the main body of the soft cover 200 and softer than the bracket 204. With this configuration, the soft cover 200 can release the airbag cushion 108 as the hook 202 deforms and falls out of the insertion hole 206 by the inflation pressure of the airbag cushion 108.

Note that, in the soft cover 200 as well, the frangible portion 117 described with respect to the soft cover 116 can be implemented. As the soft cover 200 breaks the frangible portion 117, the airbag cushion 108 can be opened without the hook 202 falling out of the insertion hole 206 of the bracket 204.

As such, the housing form of the airbag cushion 108 can be suitably held by the bracket 112 and the soft cover 200 not only during the traveling of the vehicle but also before the assembly of the airbag module 106 to the vehicle.

A preferred example of the present invention was described above while referring the accompanying drawings. However, the embodiment described above is a preferred example of the present invention, and other embodiments may be implemented or performed by various methods. In particular, unless described otherwise in the specification of the present application, the invention is not restricted to a shape, a size, configurational disposition, and the like of parts illustrated in detail in the accompanying drawings. Furthermore, expressions and terms used in the specification of the present application are used for providing the description, and thus the invention is not limited thereto, unless particularly described otherwise.

Therefore, it is obvious that a person with ordinary skill in the art can conceive various changed examples or modified examples within a scope described in the scope of the claims, which is understood to naturally belong to the technical scope of the present invention.

INDUSTRIAL APPLICABILITY

The present invention can be used in an airbag device mounted on a vehicle.

REFERENCE NUMERALS

100 . . . side airbag apparatus, 102 . . . seat, 104 . . . internal frame, 106 . . . airbag module, 108 . . . airbag cushion, 110 . . . inflator, 112 . . . bracket, 114 . . . frame-side plate portion, 116 . . . soft cover, 117 . . . frangible portion, 118 . . . stud bolt, 120 . . . bolt anchoring hole, 122 . . . hook anchoring hole, 124 . . . base, 126 . . . reaction force plate, 128 . . . through-hole, 130 . . . hook, 132 . . . front edge of bracket, 134 . . . front edge of frame-side plate portion, 136 . . . recess, 140 . . . soft cover of first modified example, 142 . . . frangible portion of modified example, 200 . . . soft cover of second modified example, 202 . . . hook, 204 . . . bracket of modified example, 206 . . . insertion hole

The invention claimed is:

1. An airbag module for attachment to a side surface of a backrest of an internal frame of a vehicle seat with frame-side plate portion, the airbag module comprising:
a bracket for attachment to the frame-side plate portion;
an inflator fixed the bracket;
an airbag cushion stored in a predetermined housing form, and fixed to the bracket along with the inflator; and
a soft cover wrapped around the bracket and the airbag cushion in the predetermined housing form, the soft cover breakable at an inflation pressure of the airbag cushion,
wherein the bracket includes;
a base to which the inflator and airbag cushion are attached, the base including a through-hole receiving a stud bolt extending from the inflator,
a reaction force plate extending from the base in a width direction of the backrest, and further bent and extended in a forward direction, and
a plurality of hooks provided on the reaction force plate, and
wherein the soft cover includes:
a bolt anchoring hole to which the stud bolt passed through the bracket is hooked, and
a plurality of hook anchoring holes to which the plurality of hooks of the bracket are hooked.

2. The airbag module according to claim 1, wherein the soft cover has a frangible portion that is breakable at an inflation pressure of the airbag cushion.

3. The airbag module according to claim 2, wherein
the plurality of hook anchoring holes are formed side by side in a row, and
the frangible portion of the soft cover is provided in a region between two adjacently formed hook anchoring holes.

4. The airbag module according to claim 1, wherein the bracket has a predetermined rigidity that is harder than the airbag cushion and the soft cover.

5. A side airbag apparatus comprising a frame-side plate portion along a side surface of a backrest of an internal frame of a vehicle seat, and an airbag module attached to the frame-side plate portion, wherein
the airbag module includes,
a bracket attached to a center side in a width direction of the backrest of the frame-side plate portion and extended to a front side of the frame-side plate portion,
an inflator fixed the bracket,
an airbag cushion wound or folded to a predetermined housing form, and fixed to the bracket along with the inflator, and
a soft cover that is wrapped around the bracket and the airbag cushion in the predetermined housing form,
the bracket includes,
a through-hole through which a stud bolt extending from the inflator passes, and
a predetermined insertion hole provided at a location on a front side of the frame-side plate portion, and
the soft cover includes,
a bolt anchoring hole to which the stud bolt passed through the bracket is hooked, and
a hook that is hooked on the insertion hole of the bracket.

6. The side airbag apparatus according to claim 5, wherein in the soft cover, the hook deforms upon receiving an inflation pressure of the airbag cushion and falls out from the insertion hole of the bracket.

7. The side airbag apparatus according to claim 5, wherein the soft cover has a frangible portion that is breakable at an inflation pressure of the airbag cushion.

8. The airbag apparatus according to claim 5, wherein the bracket includes,
a base that lies along the frame-side plate portion and to which the inflator and the airbag cushion are fixed, and
a reaction force plate is extended from the base toward an outer side in a width direction of the backrest across the front edge of the frame-side plate portion, and further bent and extended toward the front side,
the through-hole is provided in the base, and
the insertion hole is provided on the reaction force plate.

9. The side airbag apparatus according to claim 6, wherein the bracket includes,
a base that lies along the frame-side plate portion and to which the inflator and the airbag cushion are fixed, and
a reaction force plate is extended from the base toward an outer side in a width direction of the backrest across a front edge of the frame-side plate portion, and further bent and extended toward the front side,
the through-hole is provided in the base, and
the insertion hole is provided on the reaction force plate.

10. The side airbag apparatus according to claim 7, wherein the bracket includes,
- a base that lies along the frame-side plate portion and to which the inflator and the airbag cushion are fixed, and
- a reaction force plate is extended from the base toward an outer side in a width direction of the backrest across the front edge of the frame-side plate portion, and further bent and extended toward the front side, the through-hole is provided in the base, and the insertion hole is provided on the reaction force plate.

11. The side airbag apparatus according to claim 5, wherein the hook has a predetermined rigidity that is harder than a main body of the soft cover and softer than the bracket.

12. The side airbag apparatus according to claim 6, wherein the hook has a predetermined rigidity that is harder than a main body of the soft cover and softer than the bracket.

13. The side airbag apparatus according to claim 7, wherein the hook has a predetermined rigidity that is harder than a main body of the soft cover and softer than the bracket.

14. The side airbag apparatus according to claim 8, wherein the hook has a predetermined rigidity that is harder than a main body of the soft cover and softer than the bracket.

* * * * *